(12) United States Patent
Saitoh

(10) Patent No.: US 12,260,647 B2
(45) Date of Patent: Mar. 25, 2025

(54) MEASUREMENT METHOD

(71) Applicant: NEC SOLUTION INNOVATORS, LTD., Tokyo (JP)

(72) Inventor: Takeshi Saitoh, Tokyo (JP)

(73) Assignee: NEC Solution Innovators, Ltd., Tokyo (JP)

( * ) Notice: Subject to any disclaimer, the term of this patent is extended or adjusted under 35 U.S.C. 154(b) by 381 days.

(21) Appl. No.: 17/781,089

(22) PCT Filed: Nov. 19, 2020

(86) PCT No.: PCT/JP2020/043206
§ 371 (c)(1),
(2) Date: May 31, 2022

(87) PCT Pub. No.: WO2021/117457
PCT Pub. Date: Jun. 17, 2021

(65) Prior Publication Data
US 2023/0005271 A1  Jan. 5, 2023

(30) Foreign Application Priority Data
Dec. 10, 2019 (JP) .................. 2019-222718

(51) Int. Cl.
*G06V 20/52* (2022.01)
*G06T 7/70* (2017.01)

(52) U.S. Cl.
CPC ............. *G06V 20/53* (2022.01); *G06T 7/70* (2017.01); *G06T 2207/30196* (2013.01); *G06V 2201/07* (2022.01)

(58) Field of Classification Search
CPC ...... G06V 20/53; G06V 2201/07; G06T 7/70; G06T 2207/30196
USPC ........................................... 382/103
See application file for complete search history.

(56) References Cited

U.S. PATENT DOCUMENTS

| | | | |
|---|---|---|---|
| 2005/0276447 A1* | 12/2005 | Taniguchi | G06V 20/58 348/148 |
| 2014/0348383 A1* | 11/2014 | Kamiya | G06V 40/10 382/103 |
| 2015/0117773 A1* | 4/2015 | Kamiya | G06V 20/58 382/165 |
| 2020/0167701 A1* | 5/2020 | Debono | G06V 40/103 |

FOREIGN PATENT DOCUMENTS

| | | |
|---|---|---|
| JP | 2010-199855 A | 9/2010 |
| JP | 2010-199865 A | 9/2010 |
| JP | 2018-093283 A | 6/2018 |
| JP | 2020-141367 A | 9/2020 |
| WO | 2013/186984 A1 | 12/2013 |
| WO | 2017/216920 A1 | 12/2017 |

OTHER PUBLICATIONS

International Search Report for PCT Application No. PCT/JP2020/043206, mailed on Jan. 19, 2021.
JP Office Action for JP Application No. 2021-563825, mailed on Feb. 28, 2023 with English Translation.

* cited by examiner

*Primary Examiner* — Allen H Nguyen

(57) ABSTRACT

A measurement apparatus detects a person and an umbrella based on acquired image data, and measures the number of persons based on a detected result.

10 Claims, 10 Drawing Sheets

MEASUREMENT METHOD

This application is a National Stage Entry of PCT/JP2020/043206 filed on Nov. 19, 2020, which claims priority from Japanese Patent Application 2019-222718 filed on Dec. 10, 2019, the contents of all of which are incorporated herein by reference, in their entirety.

TECHNICAL FIELD

The present invention relates to a measurement method, a measurement apparatus, and a recording medium.

BACKGROUND ART

Detecting a person and the like based on image data acquired by a security camera and the like is known.

An example of such a technique is shown in, for example, Patent Document 1. Patent Document 1 describes a surveillance information gathering system including an image capture unit for surveillance, a person detecting unit that detects a person from an image captured by the image capture unit, and a locus analyzing unit that analyzes a person detected by the person detecting unit to obtain a movement locus.

Patent Document 1: Japanese Unexamined Patent Application Publication No. JP-A 2018-093283

The number of persons visiting a specific area such as a shopping mall may be measured based on image data acquired by an image capture unit such as a security camera. In such measurement, when simply detecting a person as described in Patent Document 1, it is impossible to detect a person, for example, in a case where the person's face is hidden by an umbrella, and it is impossible consequently to perform accurate measurement.

As described above, there is a problem that it is difficult to measure the number of persons based on image data in the case of bad weather such as rain.

SUMMARY

Accordingly, an object of the present invention is to provide a measurement method, a measurement apparatus and a recording medium solving the problem that it is difficult to measure the number of persons based on image data in the case of bad weather such as rain.

In order to achieve the object, a measurement method as an aspect of the present invention includes: detecting a person and an umbrella based on acquired image data; and measuring a number of persons based on a detected result.

Further, a measurement apparatus as another aspect of the present invention includes: a detecting unit configured to detect a person and an umbrella based on acquired image data; and a measuring unit configured to measure a number of persons based on a result detected by the detecting unit.

Further, a computer program as another aspect of the present invention is a computer program including instructions for causing a measurement apparatus to realize: a detecting unit configured to detect a person and an umbrella based on acquired image data; and a measuring unit configured to measure a number of persons based on a result detected by the detecting unit.

With the configurations as described above, the present invention can provide a measurement method, a measurement apparatus and a computer-readable recording medium in which a program is recorded solving the problem that it is difficult to measure the number of persons based on image data in the case of bad weather such as rain.

EXAMPLE EMBODIMENTS

First Example Embodiment

Figure 1:
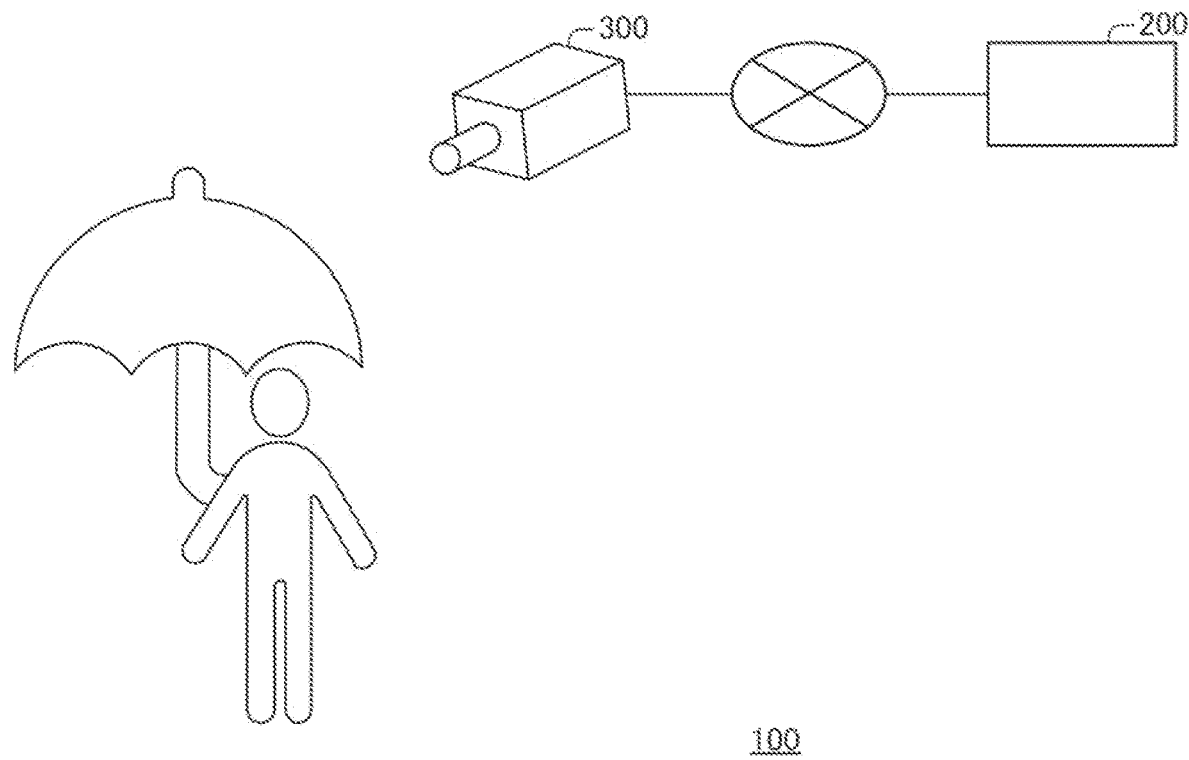
FIG. 1 is a view showing an example of a configuration of an entire measurement system according to a first example embodiment of the present invention.
Figure 2:
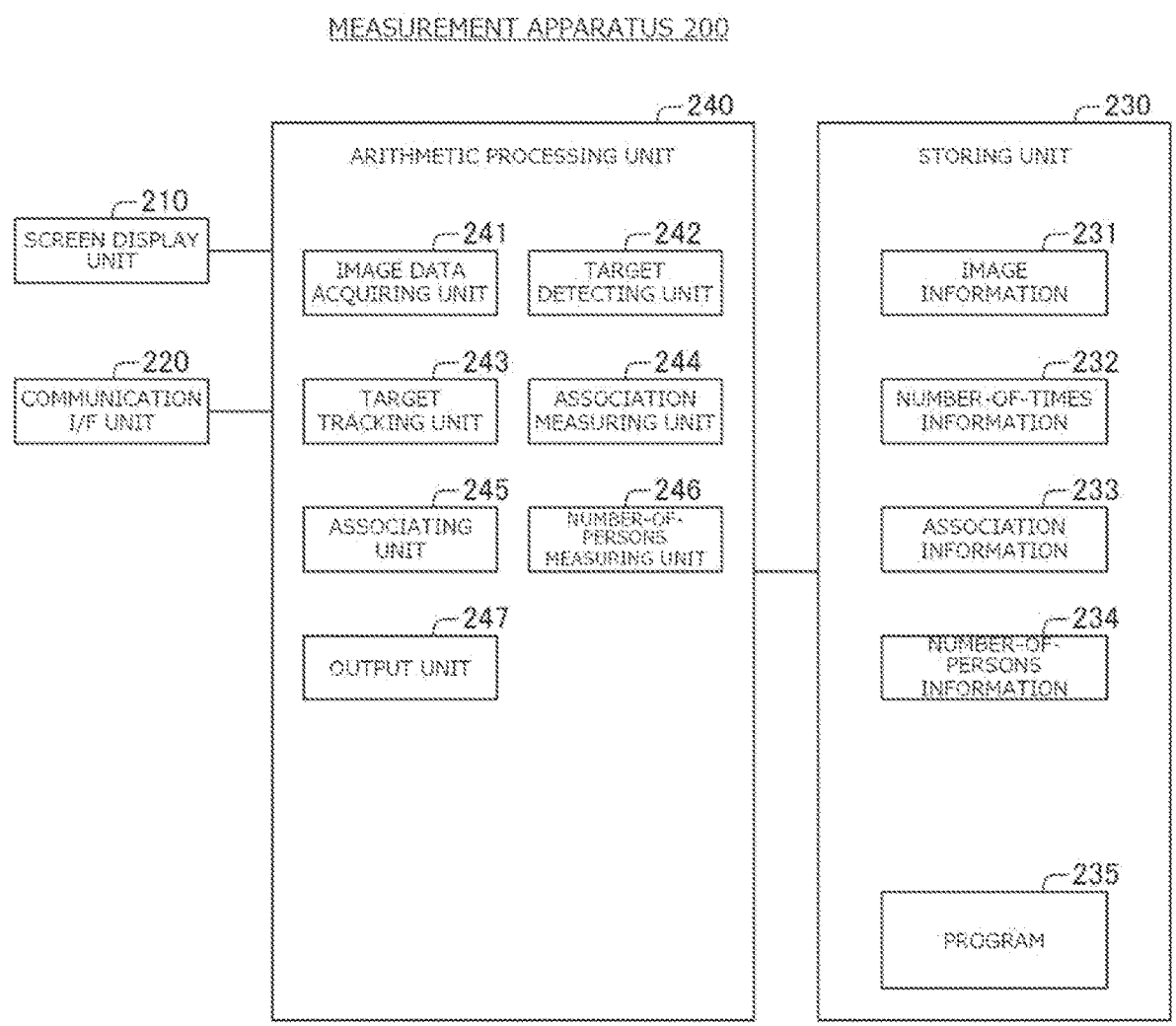
FIG. 2 is a block diagram showing an example of a configuration of a measurement apparatus shown in FIG. 1.
Figure 7:
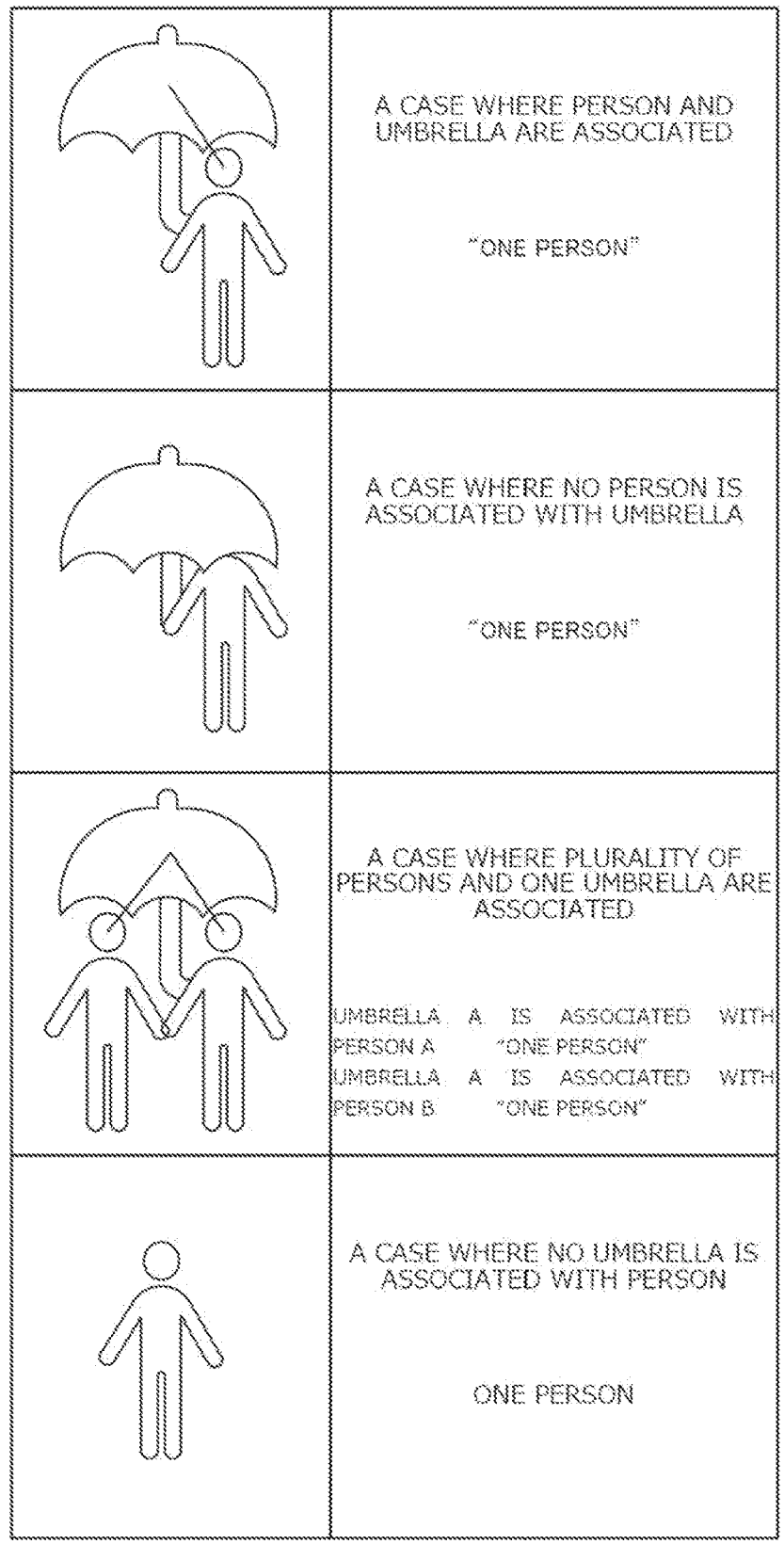
FIG. 7 is a view for describing an example of a measurement process.
Figure 8:
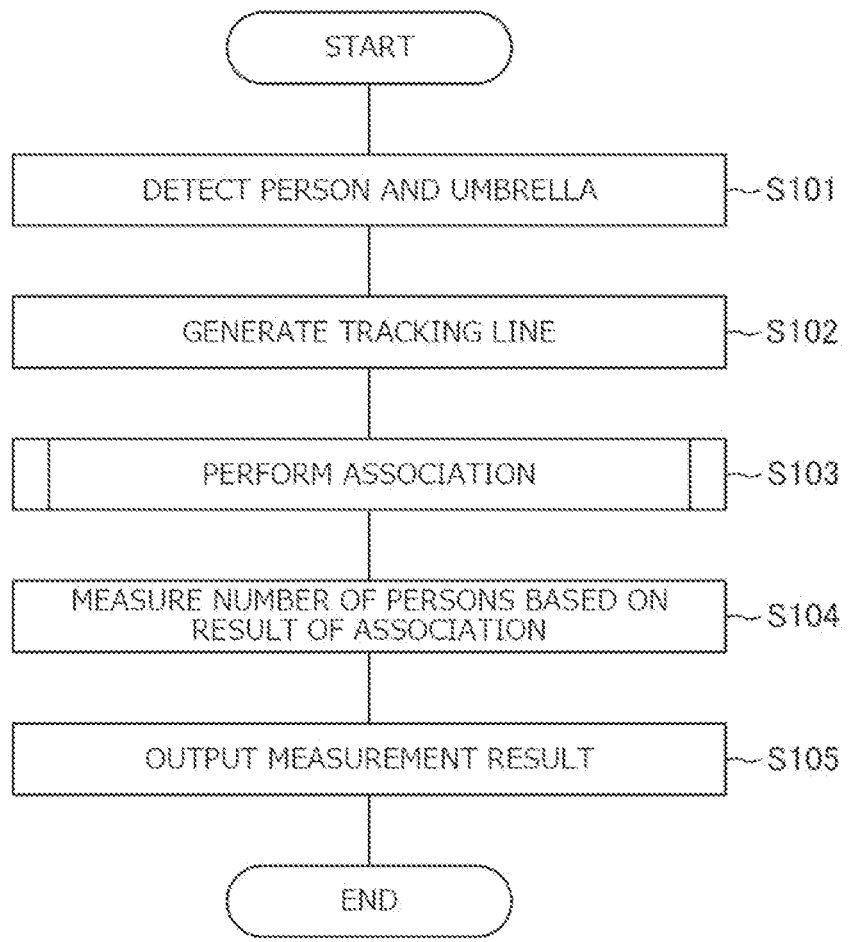
FIG. 8 is a flowchart showing an example of an overall operation of the measurement apparatus.
Figure 9:
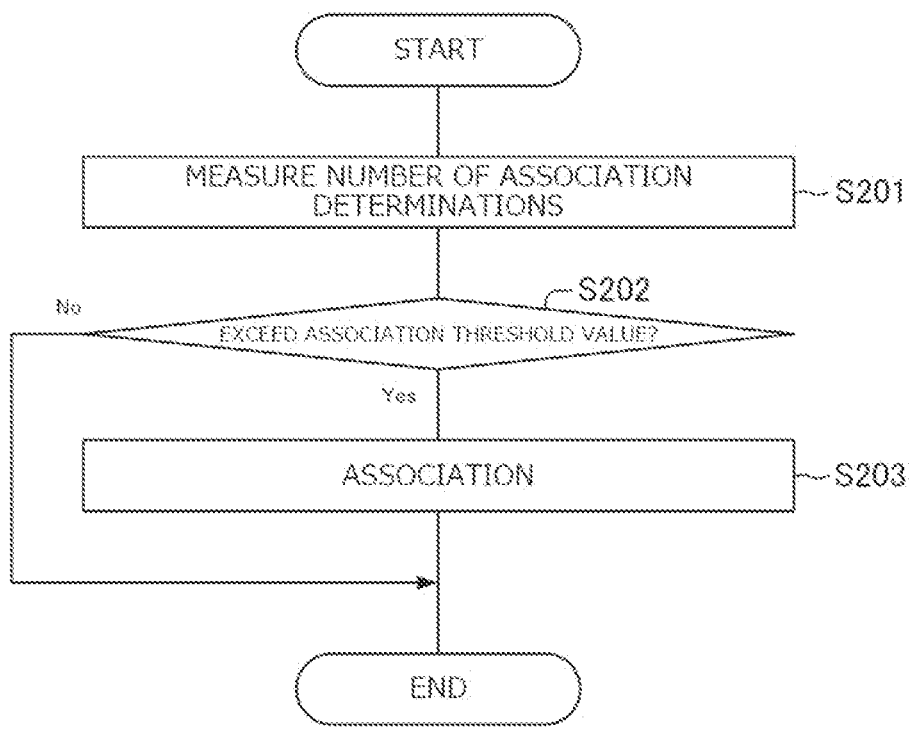
FIG. 9 is a flowchart showing an example of an operation when the measurement apparatus performs association.
Figure 10:
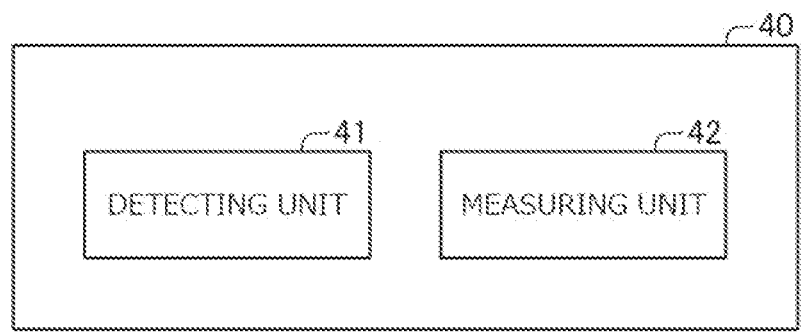
FIG. 10 is a block diagram showing an example of a configuration of a measurement apparatus according to a second example embodiment of the present invention.

A first example embodiment of the present invention will be described with reference to FIGS. 1 to 9. FIG. 1 is a view showing an example of a configuration of an entire measurement system 100. FIG. 2 is a block diagram showing an example of a configuration of a measurement apparatus 200. FIGS. 3 to 6 are views for describing examples of processing at the time of performing association. FIG. 7 is a view for describing an example of a measurement process. FIG. 8 is a flowchart showing an example of an overall operation of the measurement apparatus 200. FIG. 9 is a flowchart showing an example of an operation when the measurement apparatus 200 performs association.

In the first example embodiment of the present invention, the measurement system 100, which measures the number of persons based on image data, will be described. As will be described later, the measurement system 100 detects a person from image data and also detects an umbrella. Moreover, the measurement system 100 associates the detected person with the umbrella. Then, the measurement system 100 measures the number of persons based on the result of associating the person with the umbrella.

FIG. 1 shows an example of a configuration of the entire measurement system 100. Referring to FIG. 1, the measurement system 100 includes, for example, the measurement apparatus 200 and a security camera 300. For example, the security camera 300 is installed in a given location such as the entrance to a shopping mall or an event venue, and acquires image data including persons entering and exiting a predetermined area of the shopping mall, the event venue, and the like. The measurement apparatus 200 measures the number of persons based on the image data acquired by the security camera 300. As shown in FIG. 1, the measurement apparatus 200 and the security camera 300 are connected so as to be able to communicate with each other via a network, for example.

The numbers of the measurement apparatuses 200 and the security cameras 300 included by the measurement system 100 are not limited to one. The measurement system 100 may include a plurality of measurement apparatus 200 and a plurality of security cameras 300, for example, include a plurality of security cameras 300 installed in different locations.

The measurement apparatus 200 is an information processing apparatus that measures the number of persons based on image data acquired by the security camera 300. As will be described later, when performing the abovementioned measurement, the measurement apparatus 200 detects an umbrella together with a person, and uses the result of associating the person with the umbrella.

FIG. 2 shows an example of a configuration of the measurement apparatus 200. Referring to FIG. 2, the measurement apparatus 200 includes, as major components, a screen display unit 210, a communication I/F unit 220, a storing unit 230, and an arithmetic processing unit 240, for example.

The screen display unit 210 includes a screen display device such as an LCD (Liquid Crystal Display). The screen display unit 210 displays, on a screen, image data included by image information 231, a measurement result included by number-of-persons information 234, and so on, in accordance with an instruction from the arithmetic processing unit 240.

The communication I/F unit 220 includes a data communication circuit. For example, the communication I/F unit 220 performs data communication with the security camera 300 or an external device connected via a communication line.

The storing unit 230 is a storage device including a hard disk and a memory. The storing unit 230 stores processing information and a program 235 that are necessary for various processing in the arithmetic processing unit 240. The program 235 is loaded to and executed by the arithmetic processing unit 240 to realize various processing units. The program 235 is previously loaded from an external device or a recording medium via a data input/output function such as the communication I/F unit 220 and is stored in the storing unit 230. Major information stored by the storing unit 230 are, for example, the image information 231, number-of-times information 232, association information 233, and the number-of-persons information 234.

The arithmetic processing unit 240 has a microprocessor such as an MPU (Micro-processing unit) and a peripheral circuit thereof. By loading the program 235 from the storing unit 230 and executing the program 235, the arithmetic processing unit 240 causes the abovementioned hardware and the program 235 to cooperate and realizes various processing units. Major processing units realized by the arithmetic processing unit 240 are, for example, an image data acquiring unit 241, a target detecting unit 242, a target tracking unit 243, an association measuring unit 244, an associating unit 245, a number-of-persons measuring unit 246, and an output unit 247.

The processing units and the information described above will be described below in more detail.

The image data acquiring unit 241 acquires image data acquired by the security camera 300 from the security camera 300 via the communication I/F unit 220. Then, the image data acquiring unit 241 stores the acquired image data as the image information 231 into the storing unit 230.

As a result of the above process, image data of multiple frames is stored, for example, in chronological order in the image information 231. The image data acquiring unit 241 may be configured to, for example, make attribute information representing the date and time when the security camera 300 has acquired image data correspond to image data and store into the storing unit 230.

The target detecting unit 242 detects a predetermined detection target from image data included by the image information 231. For example, the target detecting unit 242 detects the head of a person and an umbrella that are detection targets from the image data. In other words, the target detecting unit 242 performs a process of detecting the head of a person and an umbrella for each frame so that discrimination of the type of a detection target having been detected between a person or an umbrella is possible. Moreover, the target detecting unit 242 generates a rectangle surrounding the detected head or umbrella. For example, how the rectangle generated by the target detecting unit 242 surrounds the head or the umbrella may be freely set.

The target tracking unit 243 tracks a head (person) and an umbrella detected by the target detecting unit 242 based on the result of detection by the target detecting unit 242. The target tracking unit 243 then generates a tracking line, which is a line connecting detection targets determined to be identical in the respective frames. In this example embodiment, a method used by the target tracking unit 243 when performing tracking is not particularly limited. The target tracking unit 243 can be configured to track a person and an umbrella by using a known method used at the time of tracking a person, for example. However, the target tracking unit 243 generates a tracking line so as to prevent a single tracking line from including both a spot where an umbrella is detected and a spot where a head is detected. That is to say, the target tracking unit 243 generates the tracking line of an umbrella and the tracking line of a person separately from each other.

The association measuring unit 244 measures the number of association determinations representing a possibility of an associated relation between a person and an umbrella, based on the result of detection by the target detecting unit 242, a tracking line generated by the target tracking unit 243, and so on. For example, the association measuring unit 244 increments by 1 the number of association determinations included by the number-of-times information 232 for a combination of a person and an umbrella determined to be associated based on a condition to be described later.

Further, the association measuring unit 244 performs measurement of the number of association determinations as described above on the respective frames. Consequently, the results of measurement performed on the respective frames by the association measuring unit 244 are accumulated in the number-of-times information 232.

FIGS. 3 to 6 are views for describing conditions for measuring the number of association determinations. For example, the association measuring unit 244 determines that there is a possibility of association for a combination of a person and an umbrella satisfying all the conditions shown in FIGS. 3 to 6.

Figure 3:
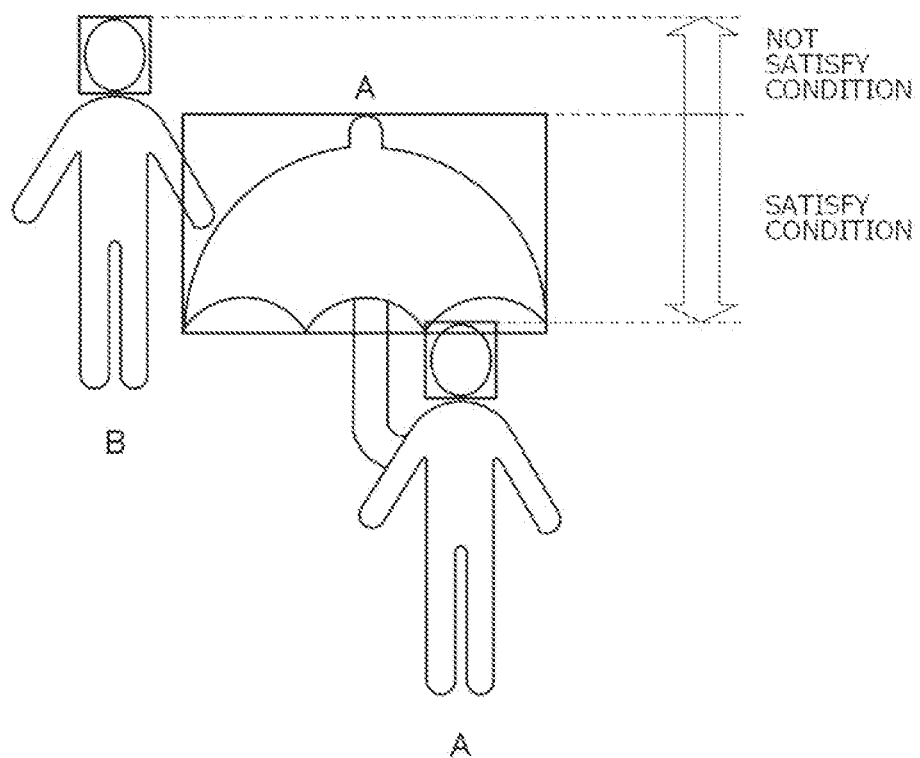
FIG. 3 is a view for describing an example of processing at the time of performing association.

For example, referring to FIG. 3, the association measuring unit 244 checks a positional relation between the rectangles of a person (head) and an umbrella detected by the target detecting unit 242. Then, in a case where the upper side of the rectangle of the head is below the upper side of the rectangle of the umbrella, the association measuring unit 244 determines that a first condition is satisfied. For example, in the case of FIG. 3, the upper side of the rectangle of a person A is below the upper side of the rectangle of an umbrella A. Therefore, the association measuring unit 244 determines that a combination of the person A and the umbrella A satisfies the first condition. On the other hand, in the case of FIG. 3, the upper side of the rectangle of a person B is above the upper side of the rectangle of the umbrella A. Therefore, the association measuring unit 244 determines that a combination of the person B and the umbrella A does not satisfy the first condition.

Figure 4:
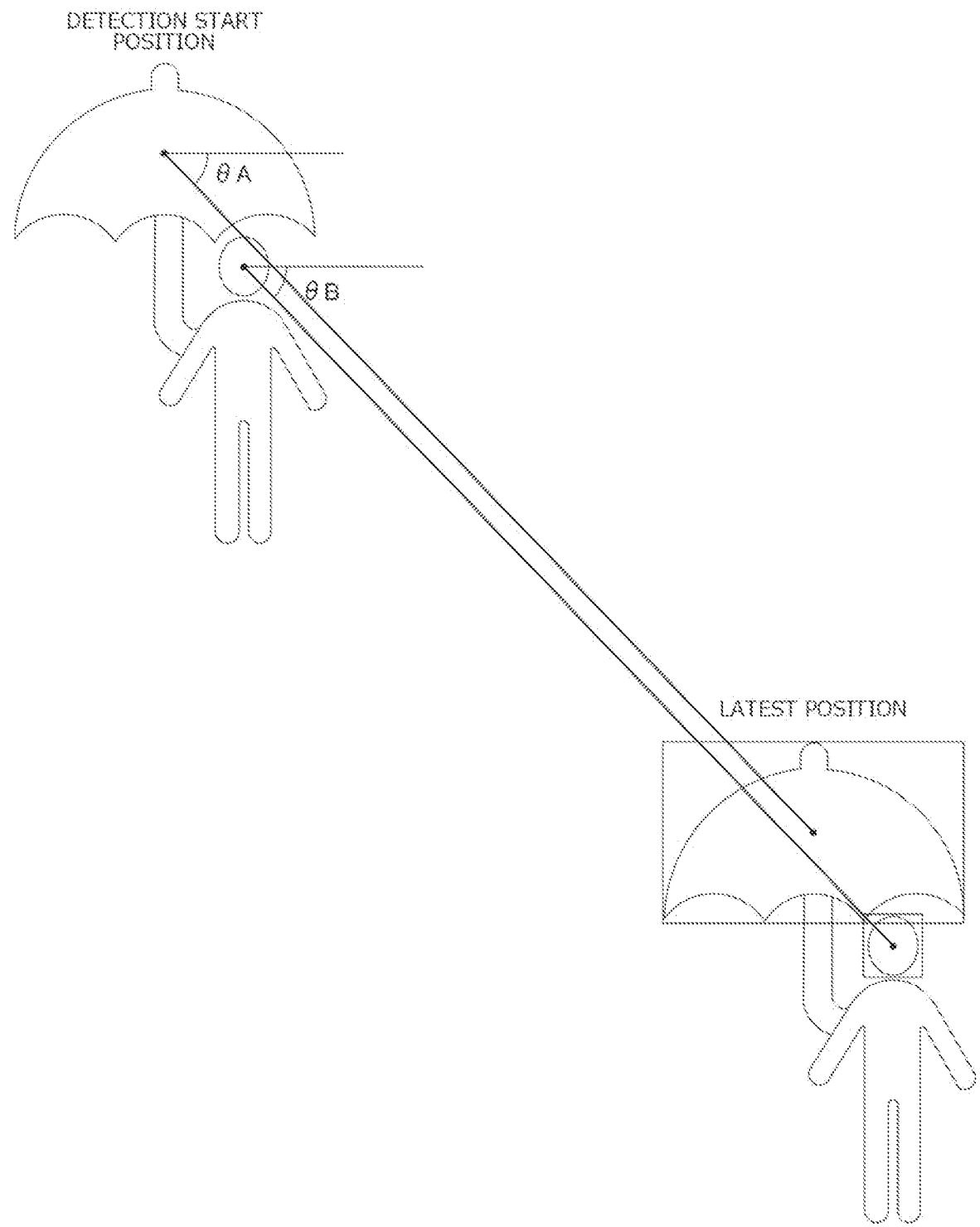
FIG. 4 is a view for describing an example of processing at the time of performing association.

Further, referring to FIG. 4, the association measuring unit 244 checks the movement angle of the tracking line of an umbrella and the movement angle of the tracking line of a person. Then, in a case where the difference between the movement angle of the tracking line of the umbrella and the movement angle of the tracking line of the person is equal to or less than a predetermined angle threshold value, the association measuring unit 244 determines that a second condition is satisfied. The tracking lines of an umbrella and a person using the umbrella generally tend to be substantially parallel. Therefore, considering the second condition makes it possible to prevent erroneous association, for example, when persons pass each other.

The movement angle of the tracking line of an umbrella and the movement angle of the tracking line of a person are, for example, as shown in FIG. 4, a movement angle from a detection start position where generation of the tracking line is started to the latest position. The movement angle of the tracking line of an umbrella and the movement angle of the tracking line of a person may be other than that illustrated in FIG. 4. For example, the movement angle of the tracking line of an umbrella and the movement angle of the tracking line of a person do not necessarily need to be a movement angle from the detection start position.

Figure 5:
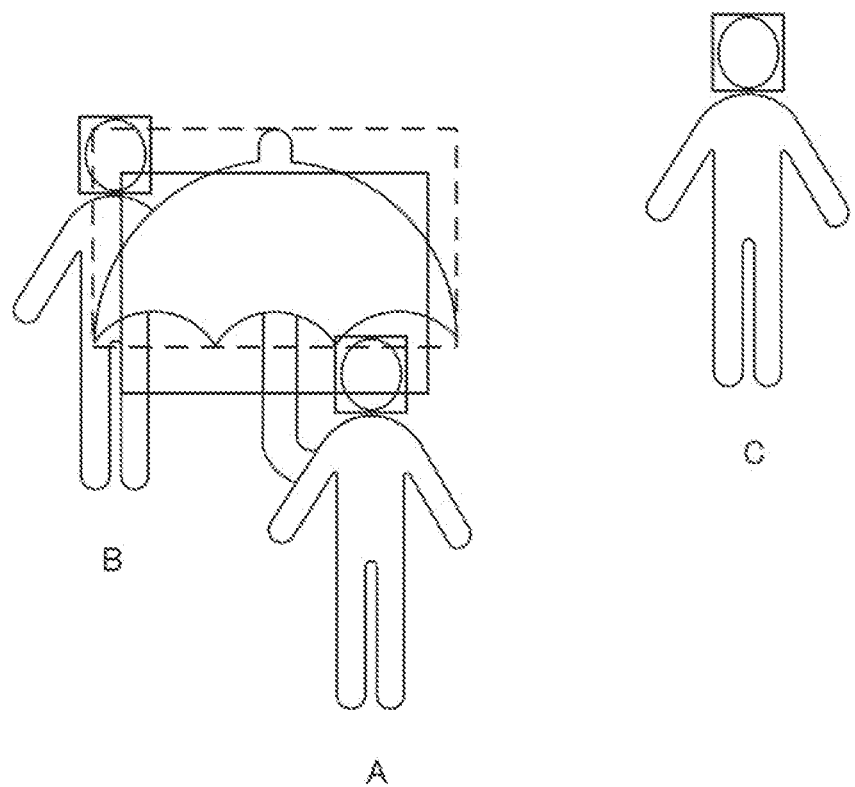
FIG. 5 is a view for describing an example of processing at the time of performing association.
Figure 6:
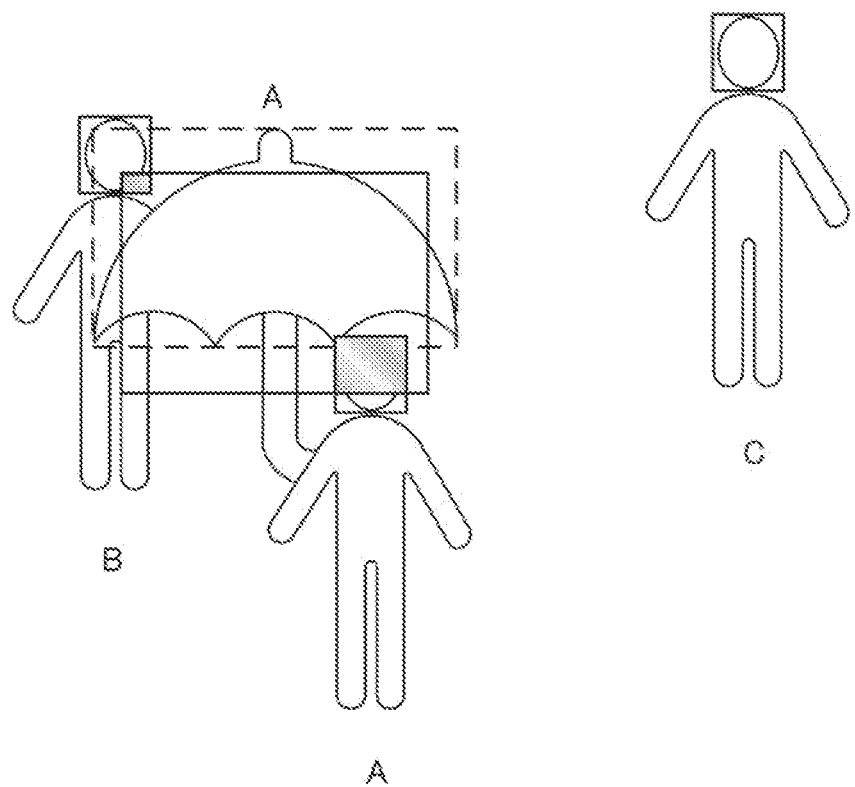
FIG. 6 is a view for describing an example of processing at the time of performing association.

Further, referring to FIGS. 5 and 6, the association measuring unit 244 checks an IoU (Intersection over Union) value indicating the overlap of rectangles. For example, the association measuring unit 244 calculates IoU values for all the combinations of the rectangles of umbrellas and the rectangles of heads existing in a frame.

The association measuring unit 244 can calculate an IoU value based on the result of deforming the rectangle of an umbrella as shown in FIGS. 5 and 6. For example, the association measuring unit 244 multiplies an x-value and a y-value corresponding to the rectangle of an umbrella by a given value, respectively, to shift the position of the rectangle of the umbrella indicated by a dotted line in FIGS. 5 and 6 to a position closer to a position in which the user of the umbrella is supposed to be indicated by a solid line in FIGS. 5 and 6. That is to say, the association measuring unit 244 moves the rectangle of the umbrella downward. Then, the association measuring unit 244 calculates IoU values for all the combinations of the shifted rectangles of umbrellas and the rectangles of heads. For example, as shown above, the association measuring unit 244 can shift the rectangle of an umbrella and then calculate the IoU value. It is generally assumed that the user of an umbrella is below the actual umbrella rectangle. Therefore, by moving the position of the rectangle of the umbrella closer to the user side, it is possible to increase the overlap rate of the rectangles and increase the accuracy of association.

To be specific, for example, referring to FIG. 6, the association measuring unit 244 calculates an IoU value by calculating the areas of portions where the shifted rectangle of the umbrella and the rectangle of the head overlap, which are indicated by frames filled with diagonal lines in FIG. 6. Then, the association measuring unit 224 determines that a third condition is satisfied for a combination that the calculated IoU value exceeds a predetermined IoU threshold value. For example, in the case of FIG. 6, the IoU value of the combination of the person A and the umbrella A exceeds the IoU threshold value. Therefore, the association measuring unit 244 determines that the third condition is satisfied for the combination of the person A and the umbrella A. On the other hand, in the case of FIG. 6, either the IoU value of the combination of the person B and the umbrella A or the IoU value of the combination of the person C and the umbrella A does not exceed the IoU threshold value. Therefore, the association measuring unit 244 determines that either the combination of the person B or the umbrella A and the combination of the person C and the umbrella A does not satisfy the third condition.

Although one umbrella may be used by a plurality of persons such as two persons in general, it is rare that one person holds a plurality of umbrellas. Therefore, association between a person and an umbrella can be such that a "many to one" state is allowed, but a "one to many" state is not allowed. From the above, for example, the association measuring unit 224 can handle a person already associated with an umbrella as not satisfy the third condition with respect to an umbrella other than the associated umbrella even if the IoU value exceeds the threshold value.

For example, as described above, the association measuring unit 224 determines whether or not there is a possibility of association based on the positional relation between a person (head) and an umbrella, the relation between the movement angle of the person and the movement angle of the umbrella, the degree of overlap between the person and the umbrella, and the like. Specifically, for example, the association measuring unit 244 determines that there is a possibility of association for a combination of a person and an umbrella that satisfies all the first condition, the second condition and the third condition described above. Then, the association measuring unit 244 increments by 1 the number of association determinations stored in the number-of-times information for the combination satisfying all the conditions.

The association measuring unit 244 may be configured to determine that there is a possibility of association when any one or two of the abovementioned first, second, and third conditions are satisfied. The association measuring unit 244 may determine that there is a possibility of association based on a condition other than illustrated above.

The associating unit 245 performs association on a combination of a person and an umbrella based on the number of association determinations measured by the association measuring unit 244. Then, the associating unit 245 stores information corresponding to the result of the association as the association information 233 into the storing unit 230.

For example, the associating unit 245 determines whether or not the number of association determinations included by the number-of-times information 232 exceeds a predetermined association threshold value. Then, in a case where the number of association determinations exceeds the association threshold value, the associating unit 245 performs association on a combination of a person and an umbrella exceeding the association threshold value. For example, the associating unit 245 performs association by making information for a person (for example, identification information) and information for an umbrella (for example, identification information) that are determined to be associated correspond to each other and storing into the association information 233.

As described above, at the time of associating a person and an umbrella, for example, a "many to one" state is allowed, but a "one to many" state is not allowed. Therefore, the associating unit 245 can be configured to, in a case where there are a plurality of combinations that the number of association determinations exceeds the association threshold value for a certain person, perform association on only a combination of the largest number of association determinations, for example.

The number-of-persons measuring unit 246 measures the number of persons in image data by using the result of association by the associating unit 245. Then, the number-of-persons measuring unit 246 stores the result of measurement as the number-of-persons information 234 into the storing unit 230.

FIG. 7 shows an example of a process when the number-of-persons measuring unit 246 measures the number of persons by using the result of association by the associating unit 245. For example, referring to FIG. 7, in a case where the target detecting unit 242 has detected a person and an umbrella and the detected person and umbrella are associated one-to-one, the number-of-persons measuring unit 246 measures the number of persons as "one person" based on the result of detection of the person and the umbrella. Moreover, in a case where the target detecting unit 242 has detected an umbrella and no person is associated with the detected umbrella (that is, in the case of an umbrella that is not associated by the associating unit 245), the number-of-persons measuring unit 246 measures the number of persons as "one person" based on the result of detection of the umbrella. Moreover, in a case where the target detecting unit 242 has detected a person and an umbrella and a plurality of persons are associated with the detected umbrella, the number-of-persons measuring unit 246 measures the number of persons as the number of persons associated with the umbrella based on the result of detection of the persons and the umbrella. For example, in a case where two persons are associated with the detected umbrella, the number-of-persons measuring unit 246 measures the number of persons as "two persons". Moreover, in a case where the target detecting unit 242 has detected a person and no umbrella is associated with the detected person (that is, in the case of a person who is not associated by the associating unit 245), the number-of-persons measuring unit 246 measures the number of persons as "one person" based on the result of detection of the person.

For example, as described above, in a case where a person and an umbrella that are associated with each other are detected, the number-of-persons measuring unit 246 performs measurement according to the number of persons associated with the umbrella. Moreover, in a case where an umbrella that is not associated with a person is detected, the number-of-persons measuring unit 246 measures the number of persons based on the result of detection of the umbrella. That is to say, even when a person is not detected, the number-of-persons measuring unit 246 measures the number of persons based on the result of detection of an umbrella.

The number-of-persons measuring unit 246 does not necessarily need to measure the number of all persons in image data. The number-of-persons measuring unit 246 may be configured to measure only the number of some persons (that is, the number of persons satisfying a condition) in image data, for example, measure the number of persons who are in a predetermined area in image data by using the result of association by the associating unit 245.

The output unit 247 outputs image data included by the image information 231, the number-of-persons information 234 that is the result of measurement by the number-of-persons measuring unit 246, and the like. For example, the output unit 247 makes the screen display unit 210 display the image data, the number-of-persons information 234, and the like, or transmits to an external device via the communication I/F unit 220.

The above is an example of the configuration of the measurement apparatus 200.

The security camera 300 is installed in a given location such as the entrance to a shopping mall. The security camera 300 acquires image data including a person entering or exiting a predetermined area. Then, the security camera 300 transmits the acquired image data to the measurement apparatus 200.

In this example embodiment, the configuration of the security camera 300 is not particularly limited. For example, the security camera 300 can have a general function such as a function of acquiring image data and also acquiring information indicating the date and time when the image data is acquired.

The above is an example of the configuration of the measurement system 100. Subsequently, an example of an operation of the measurement apparatus 200 will be described with reference to FIGS. 8 and 9.

FIG. 8 shows an example of an overall operation of the measurement apparatus 200. Referring to FIG. 8, the target detecting unit 242 detects the head of a person and an umbrella that are predetermined detection targets from image data included by the image information 231 (step S101).

The target tracking unit 243 tracks the head and the umbrella detected by the target detecting unit 242 based on the result of detection by the target detecting unit 242. Consequently, the target tracking unit 243 generates a tracking line that is a line connecting identical detection targets detected by the target detecting unit 242 in the respective frames (step S102).

The associating unit 245 performs association on a combination of a person and an umbrella based on the number of association determinations measured by the association measuring unit 244 (step S103). The details of processing by the associating unit 245 will be described later.

The number-of-persons measuring unit 246 measures the number of persons in the image data based on the result of detection by the target detecting unit 242 and the result of association by the associating unit 245 (step S104).

The output unit 247 outputs the result of measurement by the number-of-persons measuring unit 246, and so on (step S105).

The above is an example of the overall operation of the measurement apparatus 200. Subsequently, referring to FIG. 9, an example of an operation at the time of performing association will be described.

Referring to FIG. 9, the association measuring unit 244 measures the number of association determinations indicating a possibility that a person and an umbrella are associated based on the result of detection by the processing at step S101, the tracking line generated by the processing at step S102, and so on (step S201). For example, in a case where the positional relation between a person (head) and an umbrella, the relation between the movement angle of the person and the movement angle of the umbrella, and the degree of overlap of the person and the umbrella satisfy predetermined conditions, the association measuring unit 244 increments by 1 the number of association determinations included by the number-of-times information 232.

The associating unit 245 performs association on a combination of a person and an umbrella based on the number of association determinations measured by the association measuring unit 244. For example, the associating unit 245 checks whether or not the number of association determinations included in the number-of-times information 232 exceeds a predetermined association threshold value (step S202). Then, in a case where the number of association determinations exceeds the association threshold value (step S202, Yes), the associating unit 245 performs association on the combination of the person and the umbrella that exceeds the association threshold value (step S203). For example, the associating unit 245 performs association by making information for the person and information for the umbrella that are determined to be associated correspond to each other and storing into the association information 233.

The above is the operation at the time of performing association.

Thus, the measurement apparatus 200 in this example embodiment includes the target detecting unit 242, the associating unit 245, and the number-of-persons measuring unit 246. With such a configuration, the number-of-persons measuring unit 246 can measure the number of persons based on the result that the associating unit 245 associates a person and an umbrella detected by the target detecting unit 242 with each other. Consequently, for example, even when a person cannot be detected for a reason such that the head of the person is hidden by an umbrella, the number of persons having entered or exited the area can be accurately measured. Moreover, by performing association, it is possible to prevent the occurrence of double counting, such as double measurement of a person and an umbrella. As a result, even in the case of bad weather such as rain, it is possible to accurately measure the number of persons based on the image data.

Further, in this example embodiment, the association measuring unit 244 is configured to measure the number of association determinations based on the positional relation between a person (head) and an umbrella, the relation between the movement angle of a person and the movement angle of an umbrella, the degree of overlap of a person and an umbrella, or the like. Moreover, the associating unit 245 is configured to perform association based on the result of measurement by the association measuring unit 244. By thus performing association after the association measuring unit 244 considers various conditions, it is possible to prevent erroneous association from being performed. As a result, even in the case of bad weather such as rain, the number of persons can be measured more accurately based on the image data.

After the tracking line of a person or an umbrella is interrupted once for a reason such that the head is hidden by the umbrella but reappears or the umbrella is folded once and then opened again, a new tracking line may be created. In such a case, the same person may be measured multiple times.

Accordingly, the target tracking unit 243 can be configured to, in a case where the positional relation between a person and an umbrella satisfies a predetermined condition, consider a newly appearing tracking line to be identical to a previous tracking line and integrate the tracking lines. For example, in a case where the previous tracking line and e newly tracking line satisfy a condition such that the difference between the movement angle of the tracking line of a person and the movement angle of the tracking line of an umbrella is equal to or less than a movement angle threshold value, the target tracking unit 243 can integrate the tracking lines. Moreover, the target tracking unit 243 may be configured to determine the tracking lines, for example, based on attribute information indicating an attribute (gender, age, color of hair, color of cloths, color of umbrella) determined based on the image data.

Further, in this example embodiment, a case where the measurement system 100 includes the measurement apparatus 200 and the security camera 300 has been described. However, the measurement apparatus 200 and the security camera 300 may be configured integrally. That is to say, the security camera 300 may have a function as the measurement apparatus 200 described in this example embodiment. In the case of thus configuring the security camera 300, the measurement system 100 may include only the security camera 300.

Further, in this example embodiment, a case where one information processing apparatus a function as the measurement apparatus 200 has been illustrated. However, the function as the measurement apparatus 200 may be realized by a plurality of information processing apparatus connected by a network, for example.

Second Example Embodiment

Next, a second example embodiment of the present invention will be described with reference to FIG. 14. In the second example embodiment, the overview of a configuration of a measurement apparatus 40 will be described.

FIG. 14 shows an example of the configuration of the measurement apparatus 40. Referring to FIG. 14, the measurement apparatus 40 includes, for example, a detecting unit 41 and a measuring unit 42. For example, the measurement apparatus 40 includes an arithmetic logic unit such as a CPU and a storage unit. For example, the measurement apparatus 40 realizes the abovementioned given processing units by the arithmetic logic unit executing a program stored in the storage device.

The detecting unit 41 detects a person and an umbrella based on image data acquired from an external device such as an external camera, for example.

The measuring unit 42 measures the number of persons based on the result of detection by the detecting unit 41.

Thus, the measurement apparatus 40 includes the detecting unit 41 and the measuring unit 42. With such a configuration, the measuring unit 42 can measure the number of persons based on a person and an umbrella detected by the detecting unit 41. Consequently, for example, even when a person cannot be detected for a reason such that the persons is hidden by an umbrella, it is possible to accurately measure the number of persons having entered or exited the area. As a result, even in the case of bad weather such as rain, it is possible to accurately measure the number of persons based on the image data.

Further, the measurement apparatus 40 described above can be realized by installation of a given program into the measurement apparatus 40. Specifically, a program as another aspect of the present invention is a program for causing the measurement apparatus 40 to realize the detecting unit 41 detecting a person and an umbrella based on acquired image data and the measuring unit 42 measuring the number of persons based on the result of detection by the detecting unit 41.

Further, a measurement method executed by the measurement apparatus 40 described above is a method of detecting a person and an umbrella based on acquired image data and measuring the number of persons based on the result of detection.

The inventions of a program (or a recording medium) and a measurement method having the abovementioned configurations also have the same action and effect as the measurement apparatus 40, and therefore, can also achieve the abovementioned object of the present invention.

Supplementary Notes

The whole or part of the example embodiments disclosed above can be described as the following supplementary notes. Below, the outline of a measurement method and so on according to the present invention will be described. However, the present invention is not limited to the following configurations.

Supplementary Note 1

A measurement method executed by a measurement apparatus, the measurement method comprising:
 detecting a person and an umbrella based on acquired image data; and
 measuring a number of persons based on a detected result.

Supplementary Note 2

The measurement method according to Supplementary Note 1, comprising:
 associating the person and the umbrella based on the detected result; and
 measuring a number of persons based on a result of associating the person and the umbrella.

Supplementary Note 3

The measurement method according to Supplementary Note 2, comprising
 associating the person and the umbrella based on a positional relation between the person and the umbrella.

Supplementary Note 4

The measurement method according to Supplementary Note 2 or 3, comprising
 associating the person and the umbrella based on a relation between movement angles of the person and the umbrella.

Supplementary Note 5

The measurement method according to any one of Supplementary Notes 2 to 4, comprising
 associating the person and the umbrella based on how the person and the umbrella overlap.

Supplementary Note 6

The measurement method according to Supplementary Note 5, comprising
 associating the person and the umbrella based on how a rectangle enclosing a head of the person and a result of shifting a rectangle enclosing the umbrella by a predetermined method overlap.

Supplementary Note 7

The measurement method according to any one of Supplementary Notes 1 to 6, comprising
 when detecting a person and an umbrella that are associated with each other, performing the measurement corresponding to a number of persons associated with the umbrella.

Supplementary Note 8

The measurement method according to any one of Supplementary Notes 1 to 7, comprising
 when detecting an umbrella that is not associated with a person, measuring a number of persons based on a result of detecting the umbrella.

Supplementary Note 9

A measurement apparatus comprising:
 a detecting unit configured to detect a person and an umbrella based on acquired image data; and
 a measuring unit configured to measure a number of persons based on a result detected by the detecting unit.

Supplementary Note 10

A non-transitory computer-readable recording medium having a program recorded thereon, the program comprising instructions for causing a measurement apparatus to realize:
 a detecting unit configured to detect a person and an umbrella based on acquired image data; and
 a measuring unit configured to measure a number of persons based on a result detected by the detecting unit.

The program described in the respective example embodiments and supplementary notes is stored in a storage device or recorded on a computer-readable recording medium. For example, the recording medium is a portable medium such as a flexible disk, an optical disk, a magnetooptical disk, and a semiconductor memory.

Although the present invention has been described above with reference to the respective example embodiments, the present invention is not limited to the example embodiments. The configurations and details of the present invention can be changed in various manners that can be understood by one skilled in the art within the scope of the present invention.

The present invention is based upon and claims the benefit of priority from Japanese patent application No. 2019-222718, filed on Dec. 10, 2019, the disclosure of which is incorporated herein in its entirety by reference.

DESCRIPTION OF NUMERALS

100 measurement system
200 measurement apparatus
210 screen display unit
220 communication I/F unit
230 storing unit
231 image information
232 number-of-times information
233 association information
234 number-of-persons information
235 program
240 arithmetic processing unit
241 image data acquiring unit
242 target detecting unit
243 target tracking unit
244 association measuring unit
245 associating unit
246 number-of-persons measuring unit 247 output unit
300 security camera
40 measurement apparatus
41 detecting unit
42 measuring unit

What is claimed is:

1. A measurement method performed by a computer comprising:
   acquiring, from a camera, a plurality of frames of image data;
   detecting an umbrella and each of one or more heads in each frame;
   generating, on each frame, a rectangle surrounding each detected head and a rectangle surrounding the detected umbrella;
   for each head, generating a tracking line connecting the head between the frames;
   generating a tracking line connecting the umbrella between the frames;
   determining a number of associations satisfying a condition, each association including the umbrella and one of the heads; and
   outputting a number of persons in the image data as the number of the associations satisfying the condition.

2. The measurement method according to claim 1, comprising:
   associating the persons and the umbrella.

3. The measurement method according to claim 2, comprising
   associating each person and the umbrella based on a positional relation between the rectangle corresponding to the person and the umbrella in the frames.

4. The measurement method according to claim 2, comprising
   associating each person and the umbrella based on a relation between the rectangle corresponding to movement angles of the person and the umbrella in the frames.

5. The measurement method according to claim 2, comprising
   associating each person and the umbrella based on how the rectangle corresponding to the person and the umbrella overlap in the frames.

6. The measurement method according to claim 5, comprising
   associating each person and the umbrella based on how the rectangle corresponding to the person and a result of shifting a rectangle enclosing the umbrella by a predetermined method overlap.

7. The measurement method according to claim 1, comprising
   when detecting the umbrella and each of one or more heads in each frame, performing the measurement corresponding to the number of the persons associated with the umbrella.

8. The measurement method according to claim 1, comprising
   when detecting the umbrella that is not associated with the persons, measuring the number of the persons based on a result of detecting the umbrella.

9. A measurement apparatus comprising:
   a memory storing instructions; and
   a processor configured to execute the instructions to:
   acquire, from a camera, a plurality of frames of image data;
   detect an umbrella and each of one or more heads in each frame;
   generate, on each frame, a rectangle surrounding each detected head and a rectangle surrounding the detected umbrella;
   for each head, generate a tracking line connecting the head between the frames;
   generate a tracking line connecting the umbrella between the frames;
   determine a number of associations satisfying a condition, each association including the umbrella and one of the heads; and
   output a number of persons in the image data as the number of the associations satisfying the condition.

10. A non-transitory computer-readable recording medium storing a program executable by a measurement apparatus to perform a process comprising:
    acquiring, from a camera, a plurality of frames of image data;
    detecting an umbrella and each of one or more heads in each frame;
    generating, on each frame, a rectangle surrounding each detected head and a rectangle surrounding the detected umbrella;
    for each head, generating a tracking line connecting the head between the frames;
    generating a tracking line connecting the umbrella between the frames;
    determining a number of associations satisfying a condition, each association including the umbrella and one of the heads; and
    outputting a number of persons in the image data as the number of the associations satisfying the condition.

* * * * *